United States Patent

Pondelick et al.

[11] Patent Number: 5,527,045
[45] Date of Patent: Jun. 18, 1996

[54] FLOATING LABYRINTH SEAL INCLUDING METAL BAND WITH CARBON RING ENGAGING SURFACE

[75] Inventors: Mark A. Pondelick, Harvard; James M. Kemp, Libertyville, both of Ill.

[73] Assignee: Rexnord Corporation, Milwaukee, Wis.

[21] Appl. No.: 344,811

[22] Filed: Nov. 23, 1994

Related U.S. Application Data

[63] Continuation of Ser. No. 232,326, Apr. 25, 1994, abandoned, which is a continuation of Ser. No. 677,156, Mar. 29, 1991, abandoned.

[51] Int. Cl.⁶ ..................................................... F16J 15/34
[52] U.S. Cl. ........................... 277/83; 277/53; 277/173
[58] Field of Search ............................ 277/53, 55, 81 R, 277/83, 96, 96.1, 96.2, 101, 213, 215, 173

[56] References Cited

U.S. PATENT DOCUMENTS

| | | | |
|---|---|---|---|
| 2,249,930 | 7/1941 | Bailey et al. | 277/96 |
| 2,937,039 | 5/1960 | Santapa | 277/81 |
| 2,948,555 | 8/1960 | Wright | 286/11.13 |
| 3,749,419 | 7/1973 | Lingley | 277/81 R |
| 3,770,181 | 11/1973 | Stahl | 277/81 R |
| 3,920,250 | 11/1975 | Eklund | 277/51 |
| 3,948,533 | 4/1976 | Novosad | 277/81 R |
| 4,613,142 | 9/1986 | Heilala | 277/81 R |
| 4,659,092 | 4/1987 | Wallace | 277/81 R |
| 4,779,876 | 10/1988 | Novosad | 277/81 R |

FOREIGN PATENT DOCUMENTS

| | | |
|---|---|---|
| 785711 | 11/1957 | United Kingdom . |
| 1380410 | 1/1975 | United Kingdom . |
| 1524784 | 9/1978 | United Kingdom . |
| 8804369 | 6/1988 | WIPO . |

OTHER PUBLICATIONS

Rexnord Corporation, "Mechanical Seals For Rotating Shafts", pp. 21–23 No date available.

*Primary Examiner*—Daniel G. DePumpo
*Attorney, Agent, or Firm*—Michael, Best & Friedrich

[57] ABSTRACT

A seal assembly for a shaft and including an outer metallic band having an inner surface and an inner carbon ring having an outer surface engaged by the inner surface of the metal band. The inner surface of the outer metallic material band is caused to grip the inner carbon material ring so that relative shifting of the ring relative to the band is prevented.

6 Claims, 1 Drawing Sheet

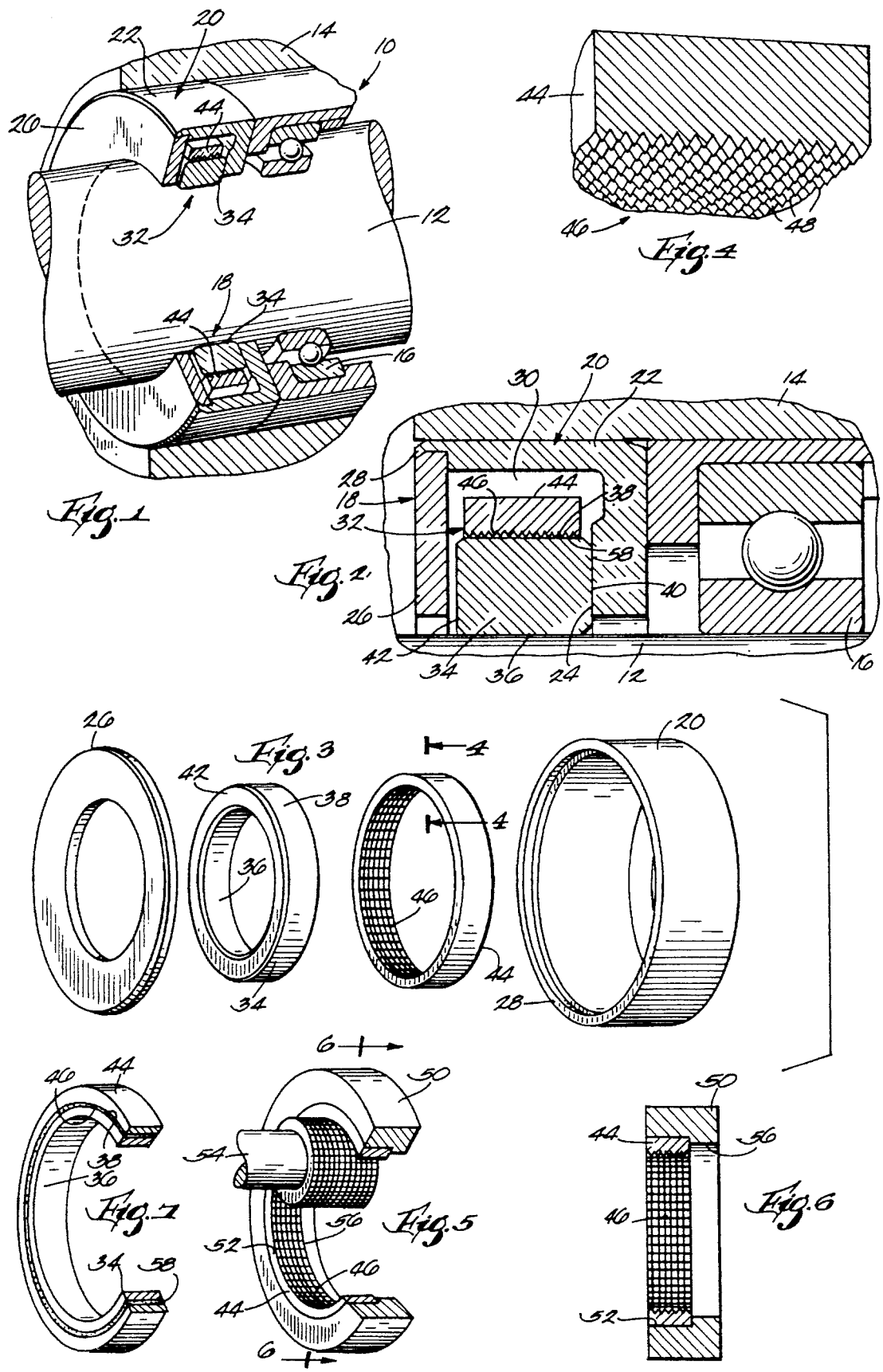

FLOATING LABYRINTH SEAL INCLUDING METAL BAND WITH CARBON RING ENGAGING SURFACE

This is a continuation of U.S. patent application Ser. No. 232,326, filed Apr. 25, 1994 abandoned, which is a continuation of U.S. patent application Ser. No. 677,156, filed Mar. 29, 1991, now abandoned.

FIELD OF THE INVENTION

The invention relates to seals of the type used to surround a rotating shaft and for sealing fluids from bearings and other mechanisms.

BACKGROUND PRIOR ART

Floating labyrinth or controlled gap seals are used in gas turbine engines, interstage compressors, refrigeration compressors, aircraft cabin compressors, jet engines, superchargers and missiles to provide a close tolerance seal around a rotating shaft. In these applications the floating labyrinth seal surrounds the shaft and functions to restrict access of hot gases, cryogens or other pressurized fluids to bearings and other structures surrounding the shaft.

Examples of prior art floating labyrinth seals are illustrated in a publication titled "Mechanical Seals for Rotating Shafts" published by Rexnord Corporation, the assignee of the present invention. As illustrated on pages 21–23 of that publication, such labyrinth seals commonly include a seal shell housing a labyrinth ring assembly, the ring assembly comprised of a carbon insert ring encased in a metal retaining band. The carbon insert ring includes an annular inner surface adapted to interface with the exterior surface of the shaft to restrict gas leakage along the surface of the shaft. It is critical that the labyrinth ring assembly be maintained nearly perfectly round in order to provide extremely close tolerance with the shaft to form a gas or fluid seal with the shaft and to accommodate very high speeds of rotation of the shaft. The shaft rotation speeds may be as high as 40,000 rpm and pressures on the labyrinth ring assembly may be as much as 2,000 psi. The effectiveness or stability of the labyrinth seal in such applications is directly related to the roundness of the inner surface of the carbon insert ring.

With prior art labyrinth ring assemblies it has been found that impact to the periphery of the metal retaining band or application of random low level energy to the metal band or carbon ring during assembly or handling can cause distortion of the ring assembly making the ring assembly useless in a seal application.

SUMMARY OF THE INVENTION

The present invention provides an improved seal for a shaft and includes an improved seal ring assembly having an increased resistance to distortion in the event of impact or application of force to the ring assembly during handling or installation of the seal.

Applicants have discovered that a force applied or directed radially into the metal band causes a circumferential shift of the carbon ring material relative to the band material at the interface between the outer metal band and the carbon insert ring. When the force on the band decays, tangential friction (hysteresis) restrains the return of the carbon ring material and the band material to their original state, in turn causing the metal band and the carbon ring insert to stay out of round. Even seemingly light impact forces, such as results when the labyrinth seal is dropped a short distance, can cause microscopic shifting at the interface between the metal band and the carbon insert ring sufficient to degrade performance of the labyrinth seal.

The present invention includes a labyrinth seal assembly wherein the inner surface of the metal band and the outer surface of the carbon insert ring are constructed to resist relative movement at their interface in the event that the metal band or carbon ring is subjected to an impact or force and to thereby stabilize the labyrinth seal.

More specifically, the invention provides a labyrinth seal assembly for a shaft comprising a seal housing adapted to surround the shaft, and a labyrinth ring assembly housed in the seal housing and between the seal housing and the shaft. The labyrinth ring assembly includes an outer metallic material band having an inner surface and an inner carbon material ring having an outer surface engaged by the inner surface of the metallic material band so that shifting of the outer metallic material band with respect to the inner carbon material ring in response to the application of a force to the labyrinth ring assembly is restricted.

In a preferred embodiment, one of the inner carbon material ring and the outer metallic material band includes means for gripping the other of the inner carbon material ring and the outer metallic material band such that relative movement of the outer metallic material band with respect to the inner carbon material ring is prevented. A bonding agent can also be used between the inner surface of the outer metallic material band and the outer surface of the inner carbon material ring to restrict relative shifting between the metallic material band and the carbon material ring.

In a preferred embodiment, the inner surface of the outer metal band includes means for gripping the outer surface of the inner carbon ring to substantially prevent relative shifting between the band and the ring. To form the gripping means the inner surface of the outer metal band is threaded and knurled.

The invention also provides a seal assembly for a shaft comprising a seal housing adapted to surround the shaft and a ring assembly housed in the seal housing and between the seal housing and the shaft. The ring assembly includes an inner carbon material ring having an outer surface, an outer metallic material band having an inner surface forming a shrink fit around the inner carbon material ring so that the inner surface engages the outer surface of the inner carbon material ring, and a bonding agent between the inner surface of the outer metallic material band and the outer surface of the inner carbon material ring.

The invention also provides a seal ring assembly for a shaft comprising an inner carbon material ring surrounding the shaft and having an outer surface and an outer metallic material band having an inner surface. The outer band forms a shrink fit around the inner ring so that the inner surface of the band engages the outer surface of the inner that shifting of the outer band with respect to the inner ring in response to the application of a force to the ring assembly is restricted.

Other features and advantages of the invention will become apparent to those skilled in the art upon review of the following detailed description, claims and drawings.

BRIEF DESCRIPTION OF THE DRAWINGS

FIG. 1 is perspective view, partially in section, of a labyrinth seal and shaft arrangement embodying various features of the invention.

FIG. 2 is an enlarged view of a portion of the seal and shaft arrangement illustrated in FIG. 1.

FIG. 3 is an exploded view of the labyrinth seal illustrated in FIG. 1.

FIG. 4 is an enlarged view taken along line 4–4 in FIG. 3 and showing a portion of a metal band including a carbon ring engaging surface.

FIG. 5 is a perspective view, partially in section, of a carrier used in forming the engaging surface illustrated in FIG. 4.

FIG. 6 is a view taken along line 6–6 in FIG. 5.

FIG. 7 is a perspective view, partially in section, of a ring assembly embodying various features of the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Illustrated in FIG. 1 is a shaft and seal arrangement 10 embodying various features of the invention. The shaft and seal arrangement 10 includes a sleeve or shaft 12 supported for rotation on a frame or housing 14 by a bearing 16. The shaft and sleeve arrangement 10 also includes an annular seal assembly 18 surrounding the shaft 12 to provide a fluid seal with the shaft 12. To facilitate handling and installation, the seal assembly 18 is preferably assembled as a cartridge unit.

While various seal assemblies having a variety of configurations suited to different operating conditions and environments can be employed, in the illustrated construction the seal assembly 18 is a floating labyrinth seal which forms a close tolerance seal around the shaft 12 to restrict or limit pressurized fluids such as hot gases or cryogens from accessing the bearing 16 or other nearby components. The labyrinth seal assembly 18 is constructed to have improved durability and performance over conventional labyrinth seals, as will be further explained below.

As shown in FIG. 2, the labyrinth seal assembly 18 comprises a seal housing 20 including an annular seal shell 22 which is preferably made of hardenable alloys, and which includes a radially extending inner sealing surface or face 24. The seal housing 20 also includes closure means such as a washer 26 which is assembled to the seal shell 22. While in other arrangements the washer 26 could be held in place in other ways, in the specific configuration shown in the drawings the washer 26 is fixed to the seal shell 22 by a radially extending rolled over lip 28 on the seal shell 22. The seal shell 22 and washer 26 together define a seal receiving cavity 30 between the seal housing 20 and the shaft 12.

The labyrinth seal assembly 18 also comprises a floating labyrinth ring assembly 32 housed by the seal housing 20 and within the cavity 30. The labyrinth ring assembly 32 includes a nearly perfectly round insert ring 34 preferably formed of carbon. The carbon insert ring 34 fits closely around the shaft 12 and includes an inner surface 36 defining the inner diameter of the insert ring 34. The inner surface 36 is preferably honed and polished to provide the extremely close tolerance needed to seal the interface between the carbon insert ring 34 and the shaft 12 and to accomodate high shaft speeds. The carbon insert ring 34 also includes an outer surface 38 defining the outer diameter of the insert ring 34 and laterally spaced radially extending surfaces or faces 40 and 42. The face 40 is engageable with the inner sealing face 24 of the seal shell 22, as will be further explained below.

The labyrinth ring assembly 32 also includes an outer retaining ring or band 44 around the carbon insert ring 34. The retaining band 44 is preferably made of metal and includes an inner surface 46 defining the inner diameter of the retaining band 44. The retaining band 44 is preferably heat shrunk or shrink fitted around the carbon insert ring 34 so that the inner surface 46 of the retaining band 44 frictionally engages the outer surface 38 of the carbon insert ring 34 and so that the insert ring 34 is securely encased in the retaining band 44.

The labyrinth ring assembly 32 is designed to match the thermal and centrifugal growth of the shaft 12 so that as temperature rises, the floating labyrinth ring assembly 32 expands and contracts thermally at a rate similar to that of the shaft 12 to ensure proper sealing over a range of temperatures and shaft speeds. More particularly, the retaining band 44 is designed to expand and contract with the shaft 12 to control the clearance between the shaft 12 and the carbon insert ring 34.

As previously explained, circumferential shifting of the carbon insert ring 34 relative to the retaining band 44, and even slight distortion or out of roundness can critically degrade the effectiveness of the labyrinth seal assembly 18.

Accordingly, means are provided on one of the retaining band 44 and the carbon insert ring 34 for gripping the other of the retaining band 44 and the carbon insert ring 34 to stabilize the labyrinth ring assembly 32 by essentially preventing relative shifting between the outer periphery of the carbon insert ring 34 and the inner surface 46 of the metal retaining band 44. While various means for gripping can be employed, in the illustrated construction the gripping means extends over preferably the entire inner surface 46 of the retaining band 44 and is provided by roughing the inner surface 46 to provide a high friction finish thereon. The roughened inner surface 46 of the retaining band 44 functions to frictionally grip the outer surface 38 of the carbon insert ring 34 to prevent relative circumferential and radial shifting between the outer surface 38 and the inner surface 46. Thus, the stability and roundness of the labyrinth ring assembly 32 is maintained to preserve the sealing qualities of the labyrinth seal assembly 18.

In one preferred form of the invention, the roughing of the inner surface 46 of the retaining band 44 is accomplished by first cutting a fine thread on the inner surface 46. This is followed by knurling the inner surface 46 to form a plurality of diamond shaped or pyramid shaped projections or teeth 48 thereon (see FIG. 4). Preferably, at least eighty teeth per inch are provided on the inner surface 46 of the retaining band 44.

To avoid deforming the retaining band 44 during the knurling operation, a band support die or carrier 50 is provided. As shown in FIGS. 5 and 6, the carrier 50 includes a first cylindrical cavity 52 in which the retaining band 44 is pressed prior to knurling. Knurling can then be performed using a knurling tool 54 or other suitable means. The retaining band 44 fits snugly into the first cavity 52 so that during the knurling operation the band 44 is prevented from moving radially and the dimensions of the band 44 are maintained. To facilitate removal of the retaining band 44 from the carrier 50, the carrier 50 also includes a second cylindrical cavity 56 having a diameter smaller than the diameter of the first cavity 52 but larger than the inside diameter of the retaining band 44.

In some applications it may be desireable to provide a bonding agent 58 such as LOCTITE wicking adhesive or other suitable material to the interface between the retaining ring 44 and the carbon insert ring 34. In such an arrangement the bonding agent 58 occupies the interstices between the teeth 48 (see FIG. 2). As shown in FIG. 7, under some conditions the bonding agent 58 can be used in lieu of the roughened inner surface 46 to prevent or reduce relative shifting between the carbon insert ring 34 and the retaining band 44. In many cases the bonding agent 58 is unable to withstand the conditions to which the labyrinth seal assembly 18 is subjected during service, thereby resulting in incineration or degradation of the bonding agent 58, but the bonding agent functions to provide stability to the labyrinth seal assembly 18 prior to service, such as during handling and installation of the seal assembly 18 when the seal assembly 18 is most likely to be impacted. Once the seal assembly 18 is installed it is much less likely to be subject to a force or impact causing it to become distorted.

In operation, the labyrinth ring assembly 32 floats on the exterior surface of the shaft 12 and the pressure drop occurring between the faces 40 and 42 of the carbon insert ring 34 provides the closing force necessary to maintain contact between the face 40 and the inner sealing face 24 of the seal shell 22, thereby providing a substantially fluid tight seal around the shaft 12. For low pressure applications, a spring (not shown) between the washer 26 and the labyrinth ring assembly 32 can be used to maintain contact between the faces 24 and 40.

Advantageously, the labyrinth seal assembly 18 resists distortion by preventing or at least reducing the occurence of relative shifting between the retaining band 44 and the carbon insert ring 34. Thus, the labyrinth seal assembly 18 of the present invention provides increased durablility and performance over conventional labyrinth seals by virtue of its decreased distortion rate.

Other features and advantages of the invention are set forth in the following claims.

We claim:

1. A seal assembly for a shaft, the seal assembly comprising:
    a seal housing adapted to surround the shaft; and
    a ring assembly housed in the seal housing and between the seal housing and the shaft, the ring assembly including
    an outer metallic material band having an inner surface,
    an inner carbon material ring having an outer surface engaged by the inner surface of the metallic material band, and
    means for preventing the inner carbon material ring from distorting in response to the application of an impact load to the outer metallic material band so that the carbon material ring is not taken out-of-round by the impact load, the means for preventing the inner carbon material ring from distorting including a roughened surface at the interface of the inner carbon material ring and the outer metallic material band for substantially preventing all relative shifting movement between the inner carbon material ring and the outer metallic material band at their interface, the roughened surface including a plurality of discrete teeth formed on the inner surface of the outer metallic material band, the teeth gripping the outer surface of the inner carbon material ring.

2. A seal assembly as set forth in claim 1 wherein the means for preventing includes a wicking adhesive between the inner surface of the outer metallic material band and the outer surface of the inner carbon material ring, the wicking adhesive assisting the roughened surface in substantially preventing relative movement between the inner carbon material ring and the outer metallic material band.

3. A floating labyrinth seal assembly for a shaft, the floating labyrinth seal assembly comprising:
    a seal housing adapted to surround the shaft, the seal housing including a radially extending sealing face;
    a floating ring assembly housed in the seal housing and between the seal housing and the shaft, the floating ring assembly including
    an inner carbon material ring mountable on a rotatable shaft, the inner carbon material ring being sized to float on the shaft, and the inner carbon material ring having an outer diameter surface, an inner diameter surface engagable with the shaft to seal around the shaft, and opposite radially extending faces, one of the radially extending faces of the inner carbon material ring being engagable with the radially extending sealing face of the seal housing to provide a seal between the seal housing and the inner carbon material ring;
    an outer metallic material band having an inner surface and forming a shrink fit around the inner carbon material ring so that the inner surface of the outer metallic material band engages the outer diameter surface of the inner carbon material ring; and
    means at the interface of the outer diameter surface of the inner carbon material ring and the inner surface of the outer metallic material band for preventing the inner carbon material ring from distorting in response to the application of an impact load to the outer metallic material band so that the carbon material ring is not taken out-of-round by the impact load, the means for preventing the inner carbon material ring from distorting including a roughened surface portion on the inner surface of the outer metallic material band for gripping the outer diameter surface of the inner carbon material ring to substantially prevent all relative movement between the inner carbon material ring and the outer metallic material band at their interface.

4. A seal assembly for a shaft, the seal assembly comprising:
    a seal housing adapted to surround the shaft, the seal housing including a radially extending sealing face; and
    a floating ring assembly housed in the seal housing and between the seal housing and the shaft, the floating ring assembly including
    a substantially perfectly round inner carbon material ring, the inner carbon material ring being mountable on a rotatable shaft, the inner carbon material ring being sized to float on the shaft, and the inner carbon material ring including an outer diameter surface, an inner diameter surface engagable with the shaft to seal around the shaft, and opposite radially extending faces, one of the radially extending faces of the inner carbon material ring being engagable with the radially extending sealing face of the seal housing to provide a seal between the seal housing and the inner carbon material ring,
    an outer metallic material band having an inner diameter surface, the outer metallic material band forming a shrink fit around the inner carbon material ring so that the inner diameter surface of the outer metallic material band engages the outer diameter surface of the inner carbon material ring, and means for preventing the inner carbon material ring from going permanently out-of-round in response to the application of an impact load to the outer metallic material band, the means for preventing the inner carbon material ring from going permanently out-of-round including a roughened surface on the inner diameter surface of the outer metallic material band so that the outer diameter surface of the inner carbon material ring is gripped by the inner diameter surface of the outer metallic material band to substantially prevent all relative movement between the inner carbon material ring and the outer metallic material band at their interface.

5. A seal assembly as set forth in claim 4 wherein the roughened surface is formed by knurling and threading the inner diameter surface of the outer metallic material band to provide a plurality of discrete projections on the inner diameter surface for engaging the outer diameter surface of the inner carbon material ring.

6. A seal assembly as set forth in claim 5 wherein the means for preventing the inner carbon material ring from going permanently out-of-round includes a wicking adhesive between the inner diameter surface of the outer metallic material band and the outer diameter surface of the inner carbon material ring for bonding the inner carbon material ring and the outer metallic material band together.

* * * * *